US009232155B1

(12) United States Patent
Tanner

(10) Patent No.: US 9,232,155 B1
(45) Date of Patent: Jan. 5, 2016

(54) AUTOMATED ALIGNMENT ADJUSTMENT FOR MULTIPLE IMAGER BASED VIDEO SYSTEMS

(71) Applicant: Altia Systems, Inc., Cupertino, CA (US)

(72) Inventor: Jason Daniel Tanner, Folsom, CA (US)

(73) Assignee: ALTIA SYSTEMS INC., Cupertino, CA (US)

( * ) Notice: Subject to any disclaimer, the term of this patent is extended or adjusted under 35 U.S.C. 154(b) by 114 days.

(21) Appl. No.: 13/902,370

(22) Filed: May 24, 2013

Related U.S. Application Data

(60) Provisional application No. 61/652,060, filed on May 25, 2012.

(51) Int. Cl.
*H04N 5/265* (2006.01)
*H04N 5/232* (2006.01)

(52) U.S. Cl.
CPC ........... *H04N 5/265* (2013.01); *H04N 5/23219* (2013.01); *H04N 5/23238* (2013.01)

(58) Field of Classification Search
CPC ............ H04N 5/23238; H04N 5/2251; H04N 5/23219; H04N 5/2651
See application file for complete search history.

(56) References Cited

U.S. PATENT DOCUMENTS

| 6,867,750 | B2* | 3/2005 | Noro ................................. 345/6 |
| 7,259,784 | B2* | 8/2007 | Cutler ........................ 348/223.1 |
| 7,327,899 | B2* | 2/2008 | Liu et al. ........................ 382/276 |
| 2002/0093465 | A1* | 7/2002 | Noro ................................. 345/6 |
| 2003/0234866 | A1* | 12/2003 | Cutler ........................ 348/207.1 |
| 2007/0206878 | A1* | 9/2007 | Liu et al. ........................ 382/276 |

* cited by examiner

*Primary Examiner* — Ahmed A Berhan
(74) *Attorney, Agent, or Firm* — HM Law Group LLP; Vani Moodley, Esq.

(57) ABSTRACT

A computer-implemented method for a multiple imager imaging system is disclosed. The method comprises detecting misalignment between a left portion of an object in a left image and a right portion of said object in a right image; wherein said misalignment is detected using factory alignment parameters to align said left and right portions; and selectively performing a recalibration operation to determine optimal alignment parameters to align said left and right portions during an image stitching operation; dynamically overriding the factory alignment parameters with the optimal alignment parameters; and performing the stitching operation based on the optimal alignment parameters.

20 Claims, 8 Drawing Sheets

400

| Alignment distance | Merge Line Coordinates | Region of Overlap |
|---|---|---|
| 8' | P(i-4),j) | R1 |
| 12" | P(i,j) | R2 |
| 20' | P(i+2,j) | R3 |

*FIG. 4*

AUTOMATED ALIGNMENT ADJUSTMENT FOR MULTIPLE IMAGER BASED VIDEO SYSTEMS

This application claims the benefit of priority to U.S. Provisional Patent Application No. 61/652,060, which was filed on May 25, 2012, the entire specification of which is incorporated herein by reference.

FIELD

Embodiments of the invention relate generally to multiple imager video systems that produce panoramic images through a process of stitching multiple images together.

BACKGROUND

Alignment is the process in which the imagers/sensors of a multiple imager video system are aligned so that when the images from the sensors are stitched, artifacts due to stitching are kept to a minimum.

FIG. 1 illustrates the process of aligning imagers 102 and 104 of a multiple (N) imager system 100 (only two of the imagers are shown). The system 100 may function independently of image resolution. However, consider the case where each imager 102,104 captures a target image indicated by reference numerals 102.1 and 104.1 at a target resolution of 440×540 pixels. Each sensor 102,104 has an actual or sensor capture area that may be larger (for example, 504×640) as indicated by reference numerals 102.2 and 104.1. During initial calibration, all N imagers are turned to their full sensor resolution (504×640) to capture a full sensor image. Thus, for each imager, there are extra pixels (+/−32, based on the resolutions given) for left/right alignment and top/bottom alignment (+/−50 pixels top/bottom, based on the resolutions given). If all images were centered and perfectly aligned, each image would use the coordinates (32,50) as the image origin with a width of 440 and height of 540. However, if the imagers did not align properly, then adjustments would have to be made for each imager to adjust its target image position/location (as specified by image origin) relative to the full sensor image.

For example, to align the sensors 102, 104, an image of a scene is captured at a fixed distance at full sensor resolution. The resulting captures are analyzed to find the best match between imagers N and N+1, N+1 and N+2, and so on. Based on the results from alignment, alignment parameters in the form of coordinates are stored for image position and image size for each image.

The point of overlap between each image is known as the merge point/line and is located in a region of overlap between adjacent images. In FIG. 1, imager 102 has a merge line 102.3 located in a region of overlap 102.4. Likewise, imager 104 has a merge line 104.3 located in a region of overlap 104.4. During alignment, if one imager (e.g. 102) is horizontally misaligned relative to another imager (say 104), the image origin for that imager is shifted to bring it into horizontal alignment. Thus, the origin of imager 102 may change from (32,50) to (20,50) to restore horizontal alignment. For proper alignment, some images may be made wider or thinner than others with different sized regions of overlap. This, the width of regions of overlap for imagers is set as an alignment parameter during alignment.

For the system 100, the origin for each image was located at (32,50) in an ideal scenario. But in reality, the origins for each image could vary from (0,0) to (M, N) where M/N combination is the maximum width/height without being considered a failure. Each image position specified by an origin (M,N) must be considered during alignment. Thus, the process of alignment processes data for thousands of possible alignment positions to find the best match between images.

After initial alignment (hereinafter "factory alignment") set prior to shipping, the imaging system 100 will use each merge point calculated for two adjacent imagers as a default value for stitching.

SUMMARY

This Summary is provided to comply with 37 C.F.R. §1.73, requiring a summary of the invention briefly indicating the nature and substance of the invention. It is submitted with the understanding that it will not be used to interpret or limit the scope or meaning of the claims.

In one aspect, there is provided computer-implemented method for a multiple imager imaging system. The method comprises detecting misalignment between a left portion of an object in a left image and a right portion of said object in a right image; wherein said misalignment is detected using factory alignment parameters to align said left and right portions; and selectively performing a recalibration operation to determine optimal alignment parameters to align said left and right portions during an image stitching operation; dynamically overriding the factory alignment parameters with the optimal alignment parameters; and performing the stitching operation based on the optimal alignment parameters Other aspects of the invention will be apparent from the detailed description below.

BRIEF DESCRIPTION OF THE DRAWINGS

In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form only in order to avoid obscuring the invention.

The present invention, in accordance with one or more various embodiments, is described in detail with reference to the following figures. The drawings are provided for purposes of illustration only and merely depict exemplary embodiments of the invention. These drawings are provided to facilitate the reader's understanding of the invention and shall not be considered limiting of the breadth, scope, or applicability of the invention. It should be noted that for clarity and ease of illustration these drawings are not necessarily made to scale.

FIG. 4 shows a flowchart of a technique for correcting alignment of a face, in accordance with one embodiment of the invention.

The figures are not intended to be exhaustive or to limit the invention to the precise form disclosed. It should be understood that the invention can be practiced with modification and alteration, and that the invention be limited only by the claims and the equivalents thereof.

DETAILED DESCRIPTION

In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form only in order to avoid obscuring the invention.

Reference in this specification to "one embodiment" or "an embodiment" means that a particular feature, structure, or characteristic described in connection with the embodiment is included in at least one embodiment of the invention. The appearance of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Moreover, although the following description contains many specifics for the purposes of illustration, anyone skilled in the art will appreciate that many variations and/or alterations to said details are within the scope of the present invention. Similarly, although many of the features of the present invention are described in terms of each other, or in conjunction with each other, one skilled in the art will appreciate that many of these features can be provided independently of other features. Accordingly, this description of the invention is set forth without any loss of generality to, and without imposing limitations upon, the invention.

Figure 1:
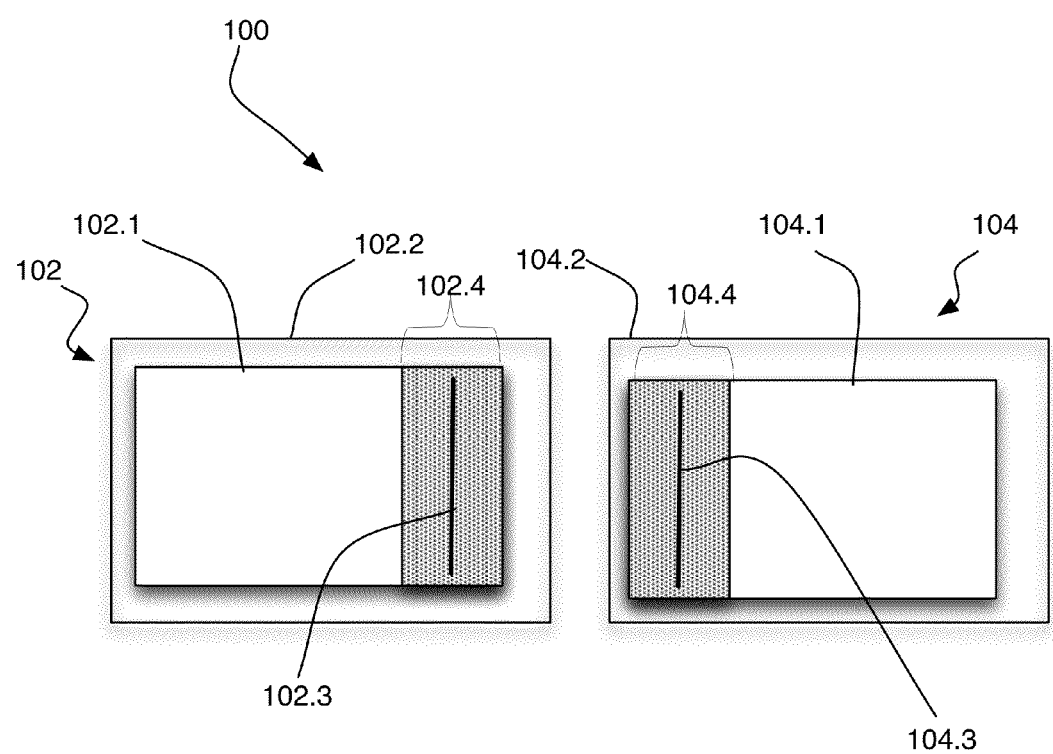
FIG. 1 illustrates the process of stitching together two images.
Figure 2:
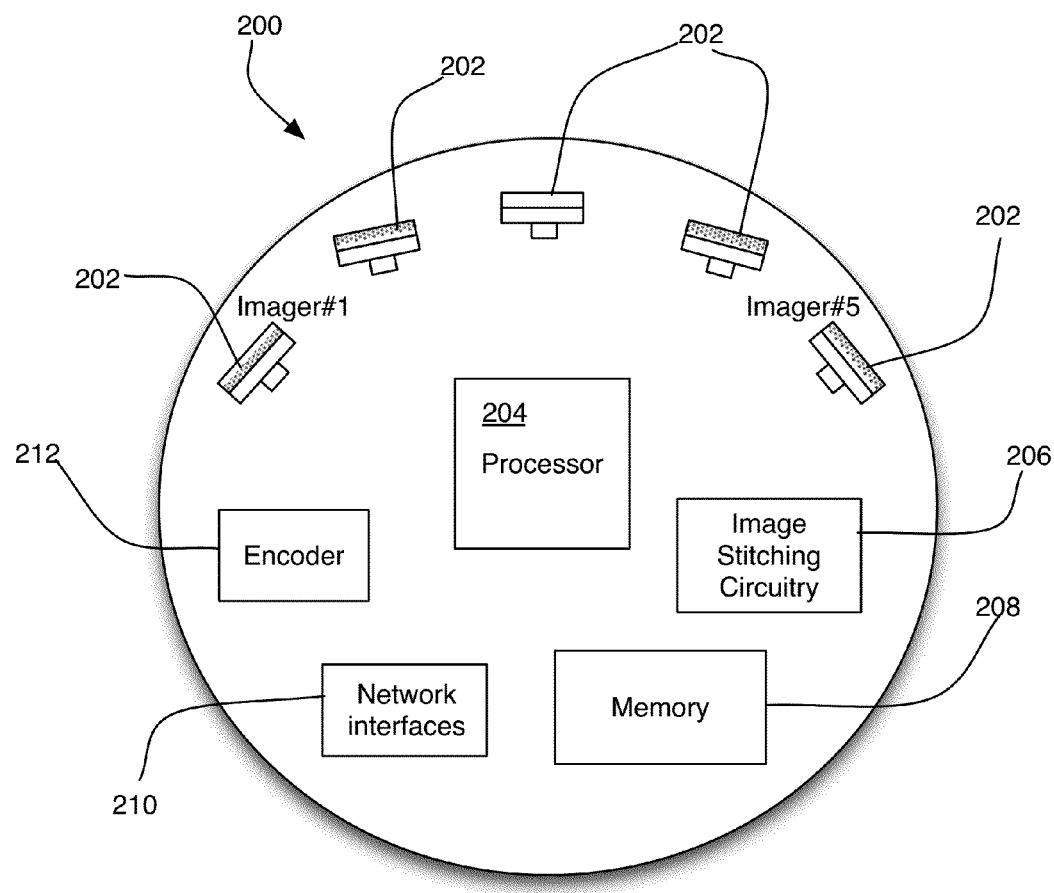
FIG. 2 illustrates a block diagram of a multiple imager imaging system, in accordance with to one embodiment of the invention.

FIG. 2 illustrates an example embodiment of an apparatus configured for generating panoramic images according to one embodiment of the invention, in the form of multiple imager video system (camera) 200.

The system 200 includes multiple imagers/sensors 202 mounted along an arc such that each imager 202 is directed to capture a portion of a scene. Each imager 202 may include suitable sensors, for example charge-coupled device (CCD) or complimentary metal-oxide semiconductor (CMOS) imaging sensors, as is known in the art.

The system 200 also includes logic/processor 204, image stitching circuitry 206, memory 208, one or more network interfaces 210, and an encoder 212 In one embodiment, digital signals recorded by sensors 202 are sent to the logic/processor 204 for processing. In one embodiment, the logic/processor 204 may execute programs for implementing image processing functions and calibration functions, as well as for controlling the operation of the entire device 200 including its image capture operations. Optionally, the logic/processor 204 may include signal processing functionality for performing image processing, including image filtering, enhancement and for combining multiple fields of view in cooperation with the image stitching circuitry 206, as will be explained in greater detail below. Although shown separately, in some embodiments, the image stitching circuitry 206 may exist as part of the logic/processor 204. It is to be understood that components of the device 200 may take the form of hardware, software, firmware, or any combination of hardware, software, and firmware.

Digital signals representing a panoramic view may be stored in memory 212. The encoder 212 may compress digital signal before transmission across via a network interface 210. The network interfaces 210 may be configured to provide network connectivity to the device 200. As such, the network interfaces 210 may include wireless and wired interfaces, in accordance with different embodiments.

Each image sensor 202 captures a different portion of a scene to be imaged. When stitching together images from the imagers 202 it is important for objects across a seam align properly with minimal artifacts.

Embodiments of the present invention disclose techniques for an in-the-field calibration operation to selectively change the alignment parameters for the system 200 from the factory-set default values during operation.

Advantageously, the techniques are based on a distance dependent relationship between merge points and regions of overlap to minimize the calculations performed for the calibration operation relative to a similar factory-performed calibration process used to initially set the alignment parameters.

Initial Calibration Across Multiple Distances

Figure 3:
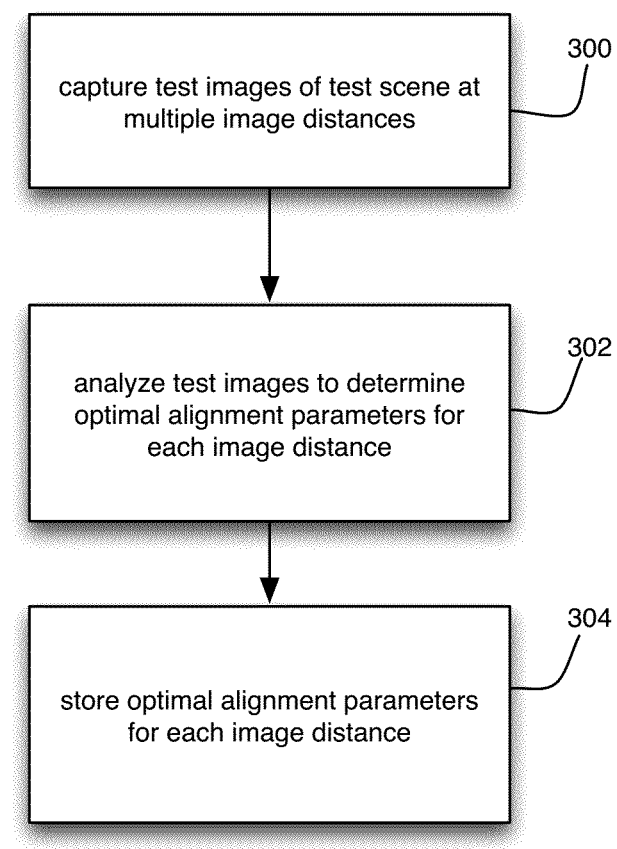
FIG. 3 shows a flowchart of a process for calibrating the multiple imager imaging system of FIG. 2.

In one embodiment, an initial calibration operation may be performed based on a representative configuration of the system 200 in terms of the types sensors, lenses, and other parameters such as the spacing between each imager. A flowchart for the initial calibration operation is shown in FIG. 3 of the drawings.

In one embodiment, for the initial calibration operation a test setup representative of the system 200 may be set up at a test facility. Using the test setup, images (hereinafter "test images") of a test scene may be taken at different distances between the test setup and the test scene. This step is indicated by reference numeral 300 in FIG. 3.

In one embodiment, based on image analysis (step 302), a distance dependent alignment relationship between merge point/line, and region of overlap may be established. In one embodiment, as a result of the initial calibration, the system 200 may be provisioned (step 304) with static or factory alignment parameters that specify a location for the merge point/line, the region of overlap, for each alignment distance. Said alignment parameters are optimal for a fixed distance, e.g. 12' to a scene being imaged.

FIG. 4 shows the alignment parameters 400 that may be stored in the memory 208 of the camera 200, in accordance with one embodiment of the invention. Referring to the alignment parameters 400, it will be seen that each imager 202 has a region of overlap R, an alignment distance, and a merge line (specified as coordinates P(i,j) relative to the region of overlap R). The alignment parameters 400 shown are only for three alignment distances. In other embodiments, the alignment parameters may include many more distances. In some cases, only a few alignment parameters corresponding to only a few distances may be stored, however the camera 400 may be configured to calculate the alignment parameters for other distances based on the distance dependent alignment relationship.

In-the-Field Recalibration

In one embodiment, during operation of the camera 200, an alignment recalibration operation may be performed to optimize the factory alignment parameters over a fixed distance range. Advantageously, said recalibration operation only checks a few different alignment positions to determine the optimal alignment position, instead of thousands. For example, consider the case where the factory alignment distance is set at 12' and each scene is to be optimized from 10' to 15'. In this example, alignment at 10' may be 2 pixels less then the current alignment (merge line) and alignment at 15' may be one pixel more than the current alignment merge line). For the above example, the alignment recalibration operation checks from −2 pixels to +1 pixels from the current alignment parameters consecutively to determine the optimal alignment parameters.

In-the-Field Recalibration for Facial Alignment

Figure 5:
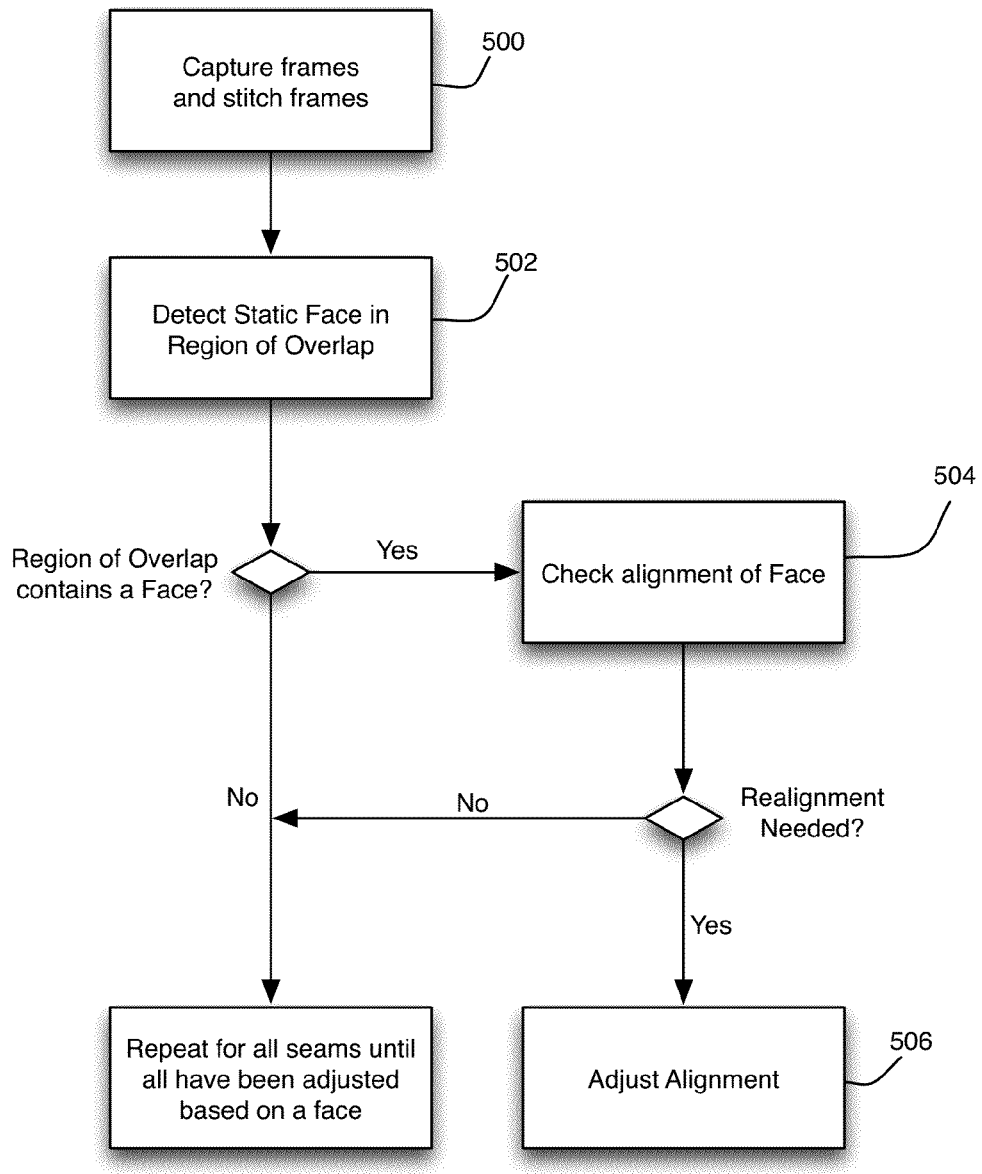
FIG. 5 shows a flowchart for a recalibration operation, in accordance with one embodiment of the invention.
Figure 6:
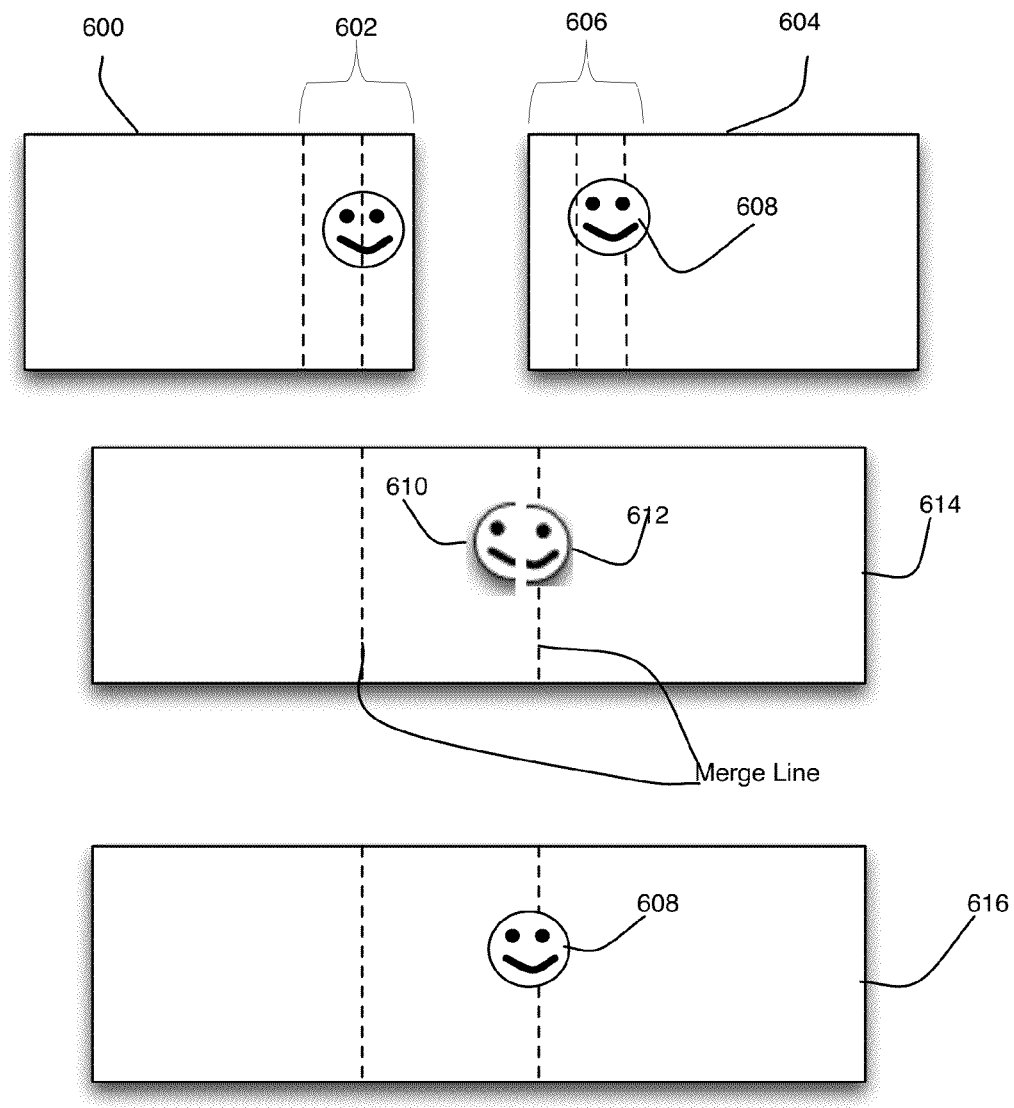
FIG. 6-7 illustrate aspects of the technique for correcting alignment of a face, in accordance with one embodiment of the invention.

For videoconferencing, the most important content in a scene are people's faces. As mentioned above, alignment varies with distance. With video conferencing it is more important that people's faces align correctly than other objects such as a back wall of a conference room. Accordingly, in one embodiment the camera 200 performs a recalibration operation to align faces correctly. Process steps in accordance with said recalibration operation are shown in FIG. 5. Referring to FIG. 5, at block 500, images are captured. For example, referring to FIG. 6, images 600 and 604 are captured.

At block 502, a face is detected in regions of overlap for the captured images. For example, a region of overlap 602 for the image 600 contains a face 608. Likewise, a region of overlap 606 for the image 604 contains the face 608. In one embodiment, a standard face detection algorithm may be used to perform the face detection. In one embodiment, the face detection distinguishes between a static face and one that is moving, e.g. because a person is walking through the conference room. To ensure that the face in the seam is indeed static, a small window of frames (say five frames) may be checked an if a location of the face remains substantially the same across the window of frames then the face is deemed to be static. One frame from the window of frames may be selected to align based just on the face, as will be described.

At block 504, the alignment of the face is checked. For example, in FIG. 6, based on the factory alignment settings, it will be seen that the face 608 includes a left portion 610 that does not align well with a right portion 612, thus producing a visual artifact in panoramic images 614.

At block 506, the alignment of the camera 200 is adjusted/recalibrated if it is determined that the face does not align well. In one embodiment, the factory alignment parameters may be used to bound/constrain potential candidates for new alignment parameters. This reduces the chance of false positives from misidentifying a face or aligning to a distance greater or less than intended. For example, in one embodiment, to perform the recalibration, different alignment parameters based on the table 400 or on the distance dependent alignment relationship may be checked in order to determine which alignment parameters will best align the face portions 610 and 612. If the new alignment parameters differ from the factory alignment parameters, then the new alignment parameters are used as the alignment for stitching.

Figure 7:
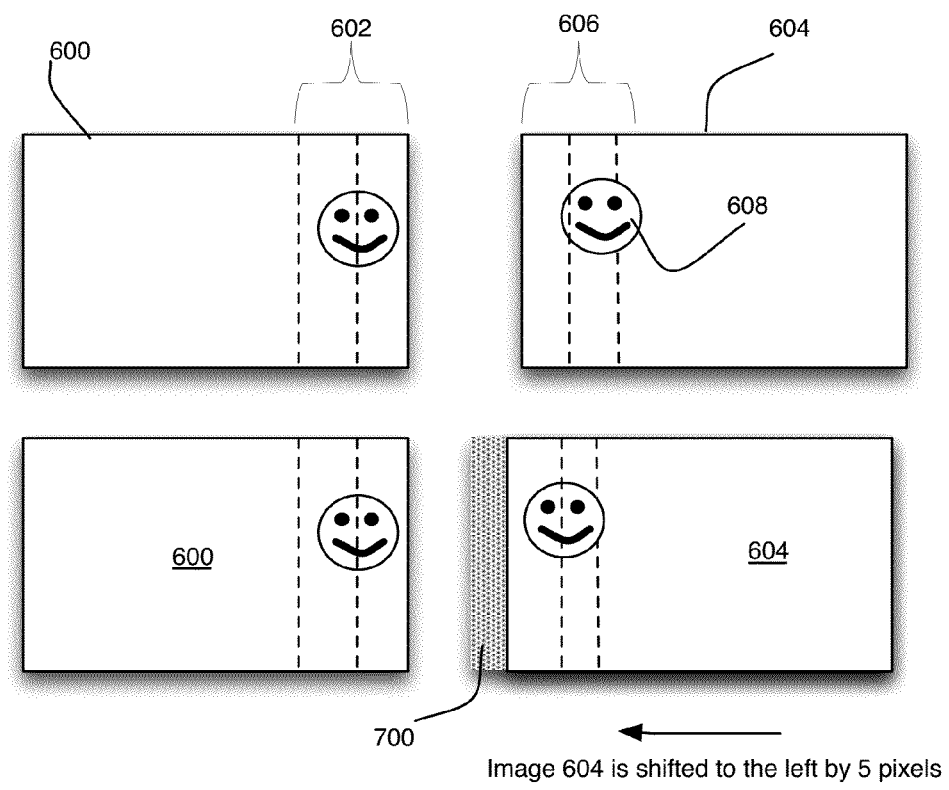

Referring again to FIG. 6, based on the factory or current alignment parameters, the face 608 does not align well as can be seen from the image 614. Assuming that the face on the image 600 is at location (5,20) relative to the region of overlap 602 and the face on the image 604 is at location (10,20) relative to the region of overlap 606. Based on these values, there the face portion 612 is misaligned with the face portion 610 by five pixels. Thus, the alignment recalibration operation described herein shifts the image 604 to the left by five pixels as indicted in FIG. 7. This results in a band 700 five pixels wide to be removed from the region of overlap 606 for the image 604.

Figure 8:
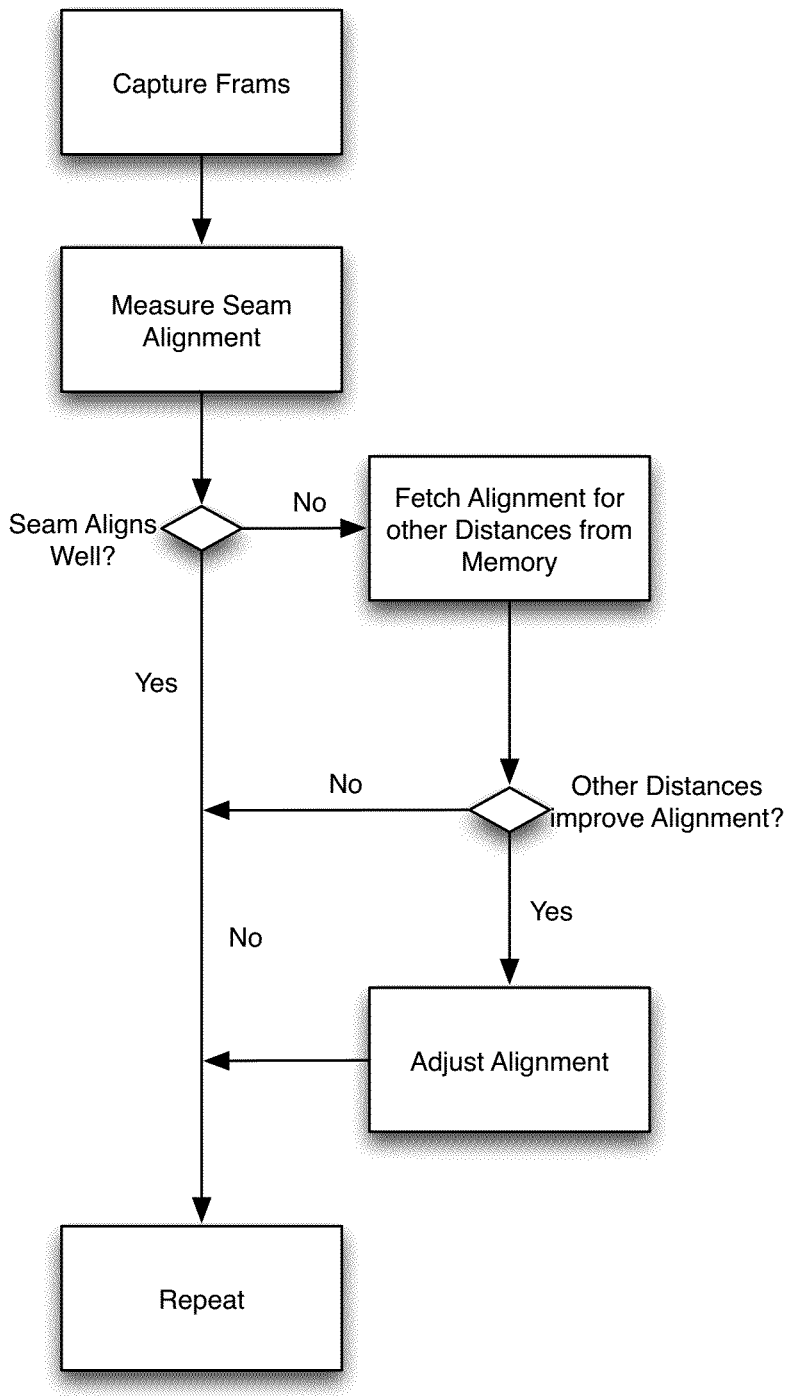
FIG. 8 shows a flowchart of a technique for correcting alignment of generalized objects during stitching, in accordance with one embodiment of the invention.

It is to be appreciated that the disclosed recalibration technique may be performed to correct for misalignment of any feature located in a seam and not just for faces located in seams. A flowchart of the recalibration technique for alignment of any seam feature is shown in FIG. 8, in accordance with one embodiment.

Numerous specific details may be set forth herein to provide a thorough understanding of a number of possible embodiments of a digital imaging system incorporating the present disclosure. It will be understood by those skilled in the art, however, that the embodiments may be practiced without these specific details. In other instances, well-known methods, procedures, components and circuits have not been described in detail so as not to obscure the embodiments. It can be appreciated that the specific structural and functional details disclosed herein may be representative and do not necessarily limit the scope of the embodiments.

The method of the present invention may be performed either in hardware, software, or any combination thereof, as those terms are currently known in the art. In particular, the present method may be carried out by software, firmware, or microcode operating on a computer or computers of any type, including preexisting or already-installed image processing facilities capable of supporting any or all of the processor's functions. Additionally, software embodying the present invention may comprise computer instructions in any form (e.g., source code, object code, interpreted code, etc.) stored in any computer-readable medium (e.g., ROM, RAM, magnetic media, punched tape or card, compact disc (CD) in any form, DVD, etc.). Furthermore, such software may also be in the form of a computer data signal embodied in a carrier wave, such as that found within the well-known Web pages transferred among devices connected to the Internet. Accordingly, the present invention is not limited to any particular platform, unless specifically stated otherwise in the present disclosure.

Although the invention is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus, the breadth and scope of the present invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

The invention claimed is:

1. A computer-implemented method for a multiple imager imaging system, comprising:
    during operation of said multiple imager imaging system, detecting misalignment between a left portion of an object in a left image and a right portion of said object in a right image; wherein said misalignment is detected using factory alignment parameters to align said left and right portions; and
    selectively performing a recalibration operation to determine optimal alignment parameters for the multiple imager imaging system, said optimal alignment parameters to align said left and right portions during an image stitching operation;
    dynamically overriding the factory alignment parameters with the optimal alignment parameters; and
    performing the stitching operation based on the optimal alignment parameter.

2. The method of claim 1, wherein the recalibration operation is performed without human input.

3. The method of claim 1, wherein performing the recalibration operation comprises checking alignment of the right and left portions based on different sets of alignment parameters stored in a memory of the multiple imager imaging system.

4. The method of claim 3, wherein each set of alignment parameters is for a different alignment distance within a predefined range of alignment distances.

5. The method of claim 3, wherein performing the recalibration operation comprises checking alignment of the right and left portions based on different sets of alignment parameters based on a known distance dependent alignment relationship for the multiple imager imaging system stored in memory.

6. The method of claim 1, further comprising executing a face detection algorithm to detect if the object is a face.

7. The method of claim 6, wherein the recalibration operation is not performed if it is detected that the face is not static.

8. A multiple imager imaging system, comprising:
    a mechanism to detect misalignment between a left portion of an object in a left image and a right portion of said object in a right image; wherein said misalignment is detected using factory alignment parameters to align said left and right portions; and
    a mechanism to selectively perform a recalibration operation to determine optimal alignment parameters to align said left and right portions during an image stitching operation;
    a mechanism to dynamically override the factory alignment parameters with the optimal alignment parameters; and
    a mechanism to perform the stitching operation based on the optimal alignment parameters.

9. The system of claim 8, wherein the recalibration operation is performed without human input.

10. The system of claim 8, wherein performing the recalibration operation comprises checking alignment of the right and left portions based on different sets of alignment parameters stored in a memory of the multiple imager imaging system.

11. The system of claim 10, wherein each set of alignment parameters is for a different alignment distance within a predefined range of alignment distances.

12. The system of claim 10, wherein performing the recalibration operation comprises checking alignment of the right and left portions based on different sets of alignment parameters based on a known distance dependent alignment relationship for the multiple imager imaging system stored in memory.

13. The system of claim 8, further comprising a mechanism to execute a face detection algorithm to detect if the object is a face.

14. The system of claim 13, wherein the recalibration operation is not performed if it is detected that the face is not static.

15. A non-transitory computer-readable medium having stored thereon a sequence of instructions which when executed by a system causes the system to perform a method for a multiple imager imaging system, comprising:
    detecting misalignment between a left portion of an object in a left image and a right portion of said object in a right image; wherein said misalignment is detected using factory alignment parameters to align said left and right portions; and
    selectively performing a recalibration operation to determine optimal alignment parameters to align said left and right portions during an image stitching operation;
    dynamically overriding the factory alignment parameters with the optimal alignment parameters; and
    performing the stitching operation based on the optimal alignment parameters.

16. The computer-readable medium of claim 15, wherein the recalibration operation is performed without human input.

17. The computer-readable medium of claim 15, wherein performing the recalibration operation comprises checking alignment of the right and left portions based on different sets of alignment parameters stored in a memory of the multiple imager imaging system.

18. The computer-readable medium of claim 17, wherein each set of alignment parameters is for a different alignment distance within a predefined range of alignment distances.

19. The computer-readable medium of claim 17, wherein performing the recalibration operation comprises checking alignment of the right and left portions based on different sets of alignment parameters based on a known distance dependent alignment relationship for the multiple imager imaging system stored in memory.

20. The computer-readable medium of claim 15, wherein the method further comprises executing a face detection algorithm to detect if the object is a face.

* * * * *